United States Patent [19]

Hanes, Jr.

[11] 4,421,007

[45] Dec. 20, 1983

[54] AIR BOMB SYSTEM

[76] Inventor: Norris H. Hanes, Jr., 192 White Birch Dr., Pease AFB, N.H. 03801

[21] Appl. No.: 329,445

[22] Filed: Dec. 10, 1981

[51] Int. Cl.³ .......................... F41F 5/02; B64D 1/04
[52] U.S. Cl. .................................................. 89/1 A
[58] Field of Search ............... 89/1 A, 1.5 R, 1.5 C, 89/1.5 D, 1.5 E; 102/384, 387, 389

[56] References Cited

U.S. PATENT DOCUMENTS

| | | |
|---|---|---|
| 1,364,152 | 1/1921 | Steinmetz . |
| 1,558,713 | 10/1925 | Steinmetz ............................ 89/1 A |
| 2,360,332 | 10/1944 | Cotton ................................. 89/1 A |
| 3,056,335 | 10/1962 | Thieblot et al. ....................... 89/1.5 |
| 3,308,719 | 3/1967 | Myers .................................. 89/1.5 |
| 3,430,562 | 3/1969 | Sautier ................................ 102/384 |
| 3,459,099 | 8/1969 | Lite, Jr. et al. ........................ 89/1.5 |
| 3,517,584 | 6/1970 | Robinson et al. ...................... 89/1.5 |

Primary Examiner—Charles T. Jordan
Attorney, Agent, or Firm—Donald J. Singer; Stanton E. Collier

[57] ABSTRACT

An air bomb system for defending an attacked aircraft from a rearward attacking aircraft utilizes a rearward-looking radar system that detects the attacking aircraft and provides information about such to a computer which calculates various times dependent events and outputs signals to a dispenser attached to the defending aircraft so that high explosive bombs are released into the path of the following aircraft. The bombs have a time-delayed detonation signal input and have also attached a lifting-body parachute that maintains the appropriate altitude of the released bomb. The pilot has a control panel for selecting various modes of operation.

8 Claims, 12 Drawing Figures

AIR BOMB SYSTEM

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a defensive system used in military aircraft and, more particularly, to an air bomb dispenser device that releases time-delayed fragmentation bombs that explode in the path of an attacking aircraft.

2. Description of the Prior Art

A well known system of protecting an aircraft from a rear attack is the use of a tail gunner system. An early means of control was a person stationed in the tail section of the aircraft. With ever increasing speeds of attacking aircraft, the person was replaced by a radar directed fire control system able to track multiple targets and quickly and accurately fire a gatling gun at the rearward approaching targets. This system is well adapted to heavy bombers wherein there is sufficient space, but modern economy sized bombers or even fighter aircraft have no space for a rearward directed gatling gun.

One system available for such aircrafts is a rearward-looking radar warning system such as an AN/ALQ-153 Tail Warning Set used in such aircraft as the FB-111. This system provides the pilot with a warning of rearward approaching aircraft or missiles and thus allows the pilot to take the necessary evasive actions which may or may not be effective where the attacking aircraft or missile is more maneuverable and quicker.

Another method of protecting the defending aircraft from a rearward attack is the release of a gas either being opaque for use as a screen or offensive in nature to disable the attacking aircraft or the crew inside. A screening gas can be effective if the attacking aircraft is required to have a visual contact before the release of its weapons. Unfortunately, however, radar directed fire or a missile can penetrate the screening gas rendering it less than effective. Furthermore, offensive gas would most likely not affect the attacking aircraft crew because of an internal air system having safe guards against either deadly or incapacitating gases. It is also unlikely that a sufficient concentration of the gas could reach the attacking aircraft to disable it on contact because of the high speed slipstream and the distances involved.

SUMMARY OF THE INVENTION

The present invention overcomes the problems encountered in the past and described in detail hereinabove by providing an air bomb system which is capable of reliably incapacitating a rearwardly attacking aircraft.

The air bomb system of this invention incorporates within a defending aircraft a rearward looking radar operably connected to an on-board computer, a dispenser attached to the under side of the aircraft, and a plurality of uniquely designed bombs that are stored within the dispenser for release at a predetermined time. The rearward looking radar in conjunction with the on-board computer controls the release of the bombs.

During appropriate conditions, such as upon approach of an attacking aircraft, the bombs are ejected from the dispenser of the defending aircraft. The bomb ejects a lifting-body parachute to maintain an altitute approximate to that of the attacking aircraft. After a given time, the bomb explodes causing a frangible casing to separate into a plurality of fragments of predetermined size. These fragments disable the following aircraft by impinging upon its surface.

One object of this invention is to provide an air bomb system that enables rearward attacked aircraft to actively defend itself by dropping a plurality of bombs to intercept the attacking aircraft.

Another object of the invention is to provide for a selectively operable system for dispensing a plurality of bombs.

Another object of this invention is to provide a dispenser for the controlled release of bombs.

A further object of the invention is to provide a bomb designed for intercepting rearward-attacking aircraft.

Other objects, advantages, and novel features of the invention will become apparent from the following detailed description of the invention when considered in conjunction with the accompanying drawings.

DETAILED DESCRIPTION OF THE PREFERRED EMBODIMENT

Figure 1:
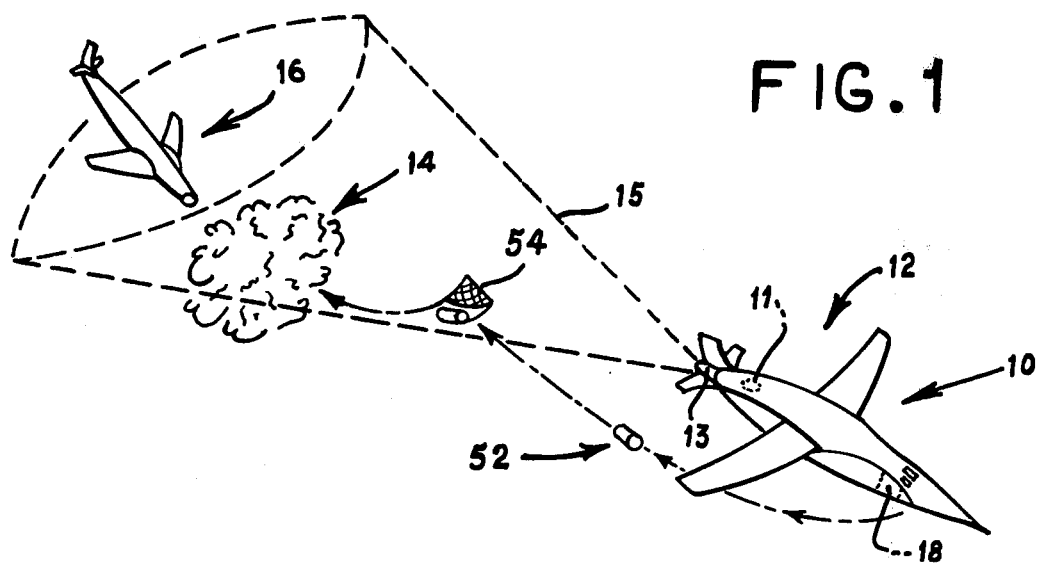
FIG. 1 is a schematic view depicting an engagement between aircraft whereby a single bomb is dispensed by the air bomb system of this invention and subsequently explodes in the vicinity of the attacking aircraft.

Referring to FIG. 1, a lead or defending aircraft 10 having the air bomb system 12 of this invention incorporated therein releases a bomb 52 having a lifting-body parachute 54 attached thereon such that a time-delayed detonation 14 occurs in the path of or vicinity of an aircraft 16 attacking lead or defending aircraft 10 from the rear. Air bomb system 12 has a conventional rearward looking radar 13 located in the tail section of defending aircraft 10. Radar 13 transmits a beam 15 to detect approaching attacking aircraft 16. Radar data is fed into an on-board computer 11 that determins when to release and detonate bomb 52. Bomb 52 is released by a dispenser 18 shown in FIGS. 3-6 on computer or manual command.

Figure 2:
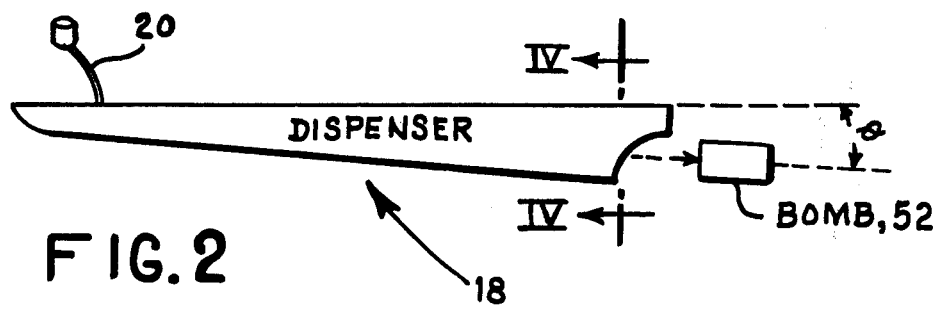
FIG. 2 is a side view of a bomb dispenser of this invention.

Reference is now made to FIG. 2 which clearly illustrates a dispenser 18 making up an essential component of the air bomb system 12 of this invention. Dispenser 18 is made of any suitable light weight material such as aluminum and is shaped on the exterior to conform to the body of aircraft 10 and aerodynamically to reduce drag. Dispenser 18 is detachably mounted by conventional means such as rails or the like to the underside of aircraft 10 so that the unit is easily removed for maintenance and testing. A cable 20 electrically connects dispenser 18 to computer 11 to be described in detail hereinafter. It should be noted that as bomb 52 exits dispenser 18, bomb 52 leaves at an angle θ away from the aircraft's body so as to avoid contact and damage therewith. The velocity of bomb 52 is sufficient so that the air stream does not force bomb 52 into the body of aircraft 10.

Figure 3:
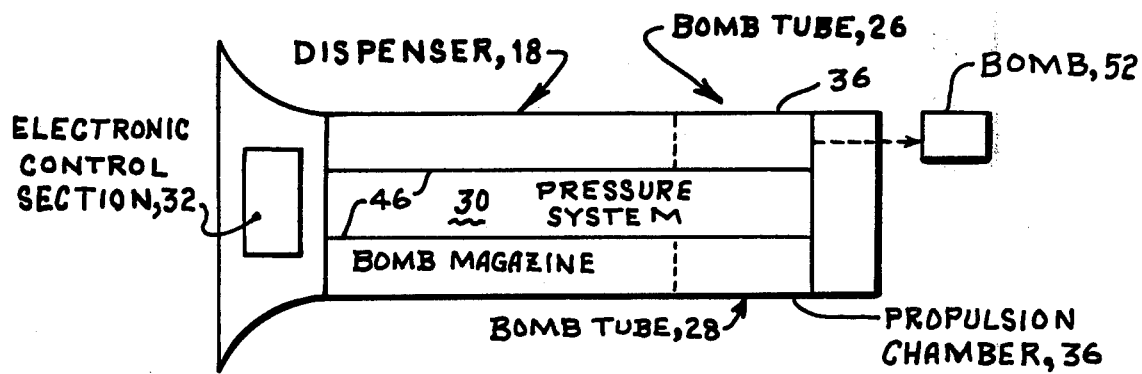
FIG. 3 is a plan view of the bottom of the bomb dispenser of this invention.

The bottom of dispenser 18, FIG. 3, shows two bomb tubes 26 and 28, a pneumatic pressure system 30 and an electronic control section 32. Each tube 26 and 28 holds a plurality of bombs 52, such as five in number. Upon a firing command, pressure system 30 ejects bomb 52 from a propulsion chamber 36, shown in FIGS. 3 and 5, at the rear end of tubes 26 and 28. Each tube 26 and 28 has a bomb magazine 46, shown in FIGS. 3 and 5, capable of holding a plurality of bombs 52, and the propulsion chamber 36.

Figure 4:
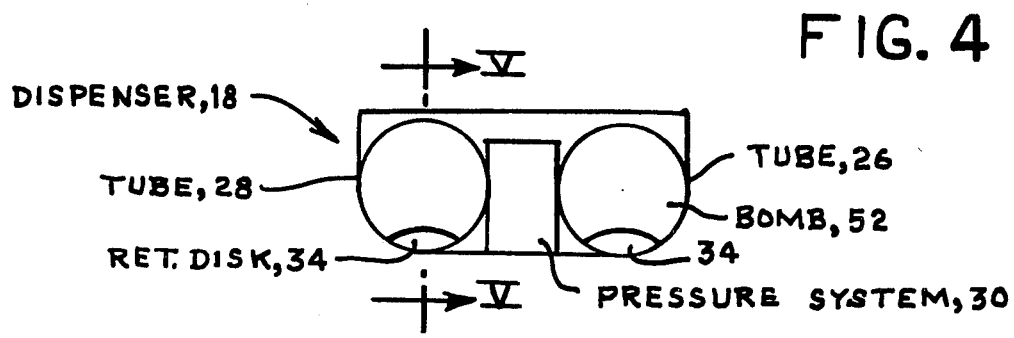
FIG. 4 is a cross sectional view taken along lines IV—IV of FIG. 2.

FIG. 4 shows an end view of dispenser 18. A retention disk 34 restrains bombs 52 inside of tubes 26 and 28 until pressure system 30 ejects bomb 52 with a high pressure charge deflecting disk 34 from a path of travel of bomb 52.

Figure 5:
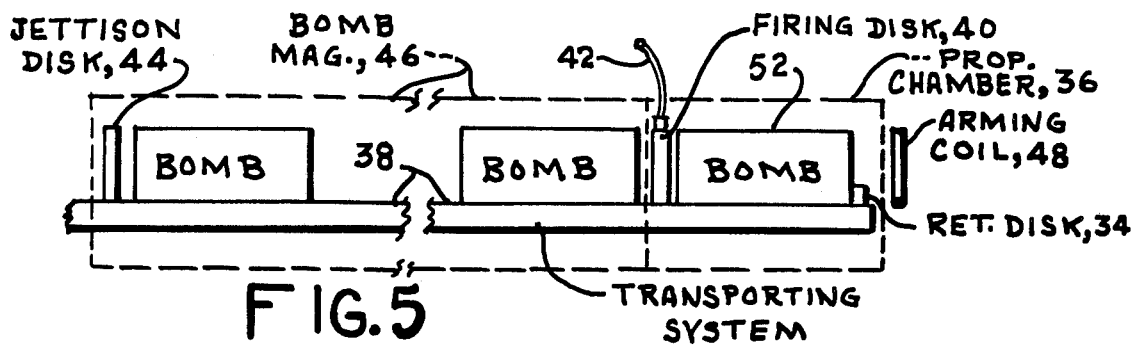
FIG. 5 is a cross sectional side view partially showing the interior of the bomb dispenser of this invention taken along lines V—V of FIG. 4.

FIG. 5 shows schematically the interior of dispenser 18 containing transporting system 38 for loading bombs 52 into propulsion chamber 36 from magazine 46. Transporting system 38 may take the form of any conventional feeding device such as a continuous belt-feed system.

The bomb position shown in FIG. 5 is that assumed in the ready-to-fire position. The right most bomb 52 is in propulsion chamber 36 chambered between retention disk 34 and a firing disk 40. Other bombs 52 are in magazine 46 between a jettison disk 44 and firing disk 40. Pressure system 30 shown in FIGS. 3 and 4, upon the firing command, releases a high pressure gas stream through hose 42 which exits through firing disk 40, shown in FIG. 6, to push bomb 52 from propulsion chamber 36. After this, firing disk 40 is withdrawn by conventional electromechanical means (not shown) from the tube to allow another bomb 52 to be transported to a standby position approximately one half inch from the ready-to-fire position. Upon another command, bomb 52 is moved to a ready-to-fire position thereafter firing disk 40 is inserted behind bomb 52. The means for transporting the firing disk 40 and retention disk 34 can be either electrically or pneumatically actuated.

Jettison disk 44 is positioned at one end of magazine 46 so that upon a jettison command, high pressure gas forces all bombs 52 from respective tubes.

Figure 6:
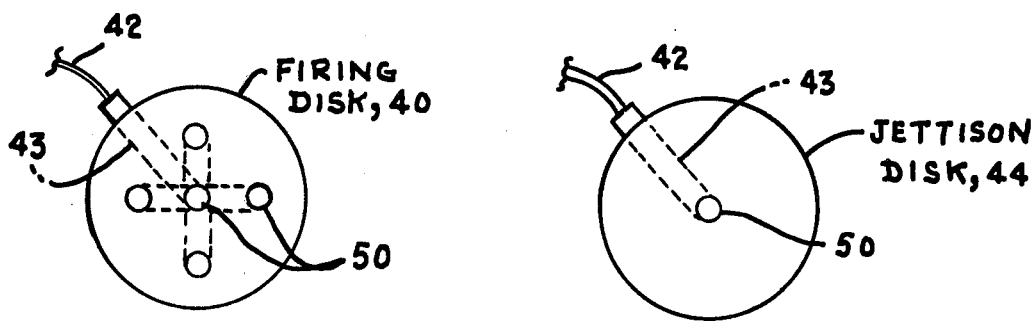
FIG. 6 is a side view of disks used in the dispenser of this invention.

FIG. 6 illustrates a preferred embodiment of firing disk 40 and jettison disk 44. The number and positioning of gas ports 50 is determined by function and the amount of pressure needed. Pressurized gas enters by hose 42 and travels by gas channels 43 to ports 50.

Figure 7:
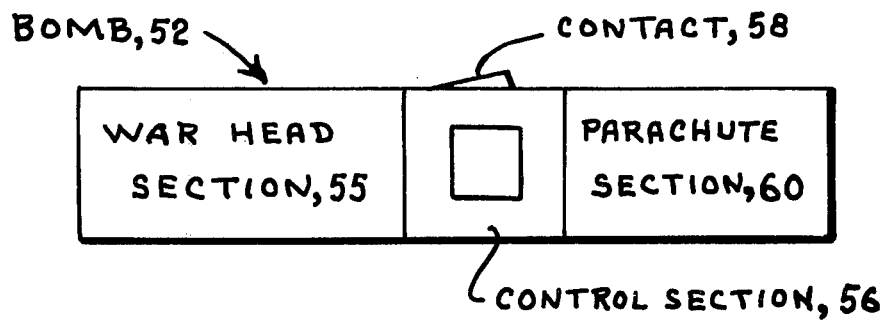
FIG. 7 is a side view of a bomb of this invention.

FIG. 7 is a schematic side view of bomb 52. A typical size for bomb 52 may be approximately 20 inches long and 4 inches in diameter, although it should be noted that these dimensions may vary in accordance with the use of air bomb system 12 of this invention. Bomb 52 further has a warhead section 55, a control section 56, including an electrical contact 58, and a parachute section 60.

Warhead section 55 uses conventional high energy explosives, about ten pounds, and a frangible casing that fragments into pieces of metal of a predetermined size. The design of such a casing is well known in the art. A further embodiment of bombs 52 may include the use of a shaped charge with a frangible casing wherein the exploding fragments can be primarily directed to the attacking aircraft since the lifting-body parachute 54 would properly orient bomb 52 after release. Control section 56, shown in FIG. 12, is composed of a timing means such as a time-selected device 62, a pulse battery 64, and an arming device 66.

Time-select device 62 can be a conventional microcomputer or the like which actuates parachute section 60, initiates arming device 66, and detonates warhead 55 after a given time delay. This time delay can vary from one second to about 20 seconds. The time selection can either be performed manually during loading, or automatically wherein the manual setting is disregarded.

Figure 10:
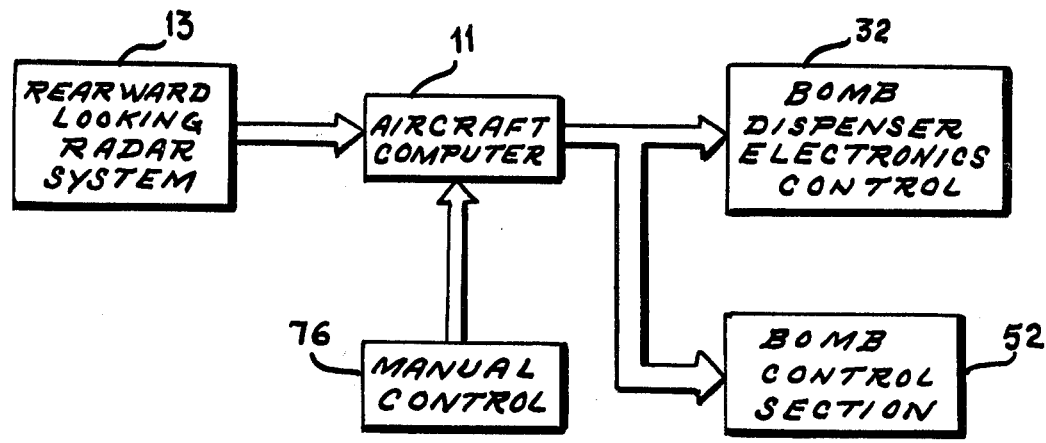
FIG. 10 is a functional block diagram of the electronic system of this invention.

In the manual mode, the time delay is set in control section 56, FIG. 7, before bomb 52 is loaded into tubes 26 and 28. In the automatic mode, rearward looking radar 13 in cooperation with computer 11 not only warns the pilot of attacking aircraft 16 but determines a detonation time delay from the velocities of the two aircraft, distance apart, and the flight characteristics of bomb 52 after release from aircraft 10. Radar 13 by means of beam 15 detects attacking aircraft 16 and outputs convention radar data, FIG. 10, such as range as a function of time to computer 11. Computer 11 is a conventional computer like a microcomputer for computing a time delay for bomb detonation and when bomb 52 is to be released. Computer 11 further provides appropriate signals to bomb dispenser control section 32 and bomb control section 56.

Figure 12:
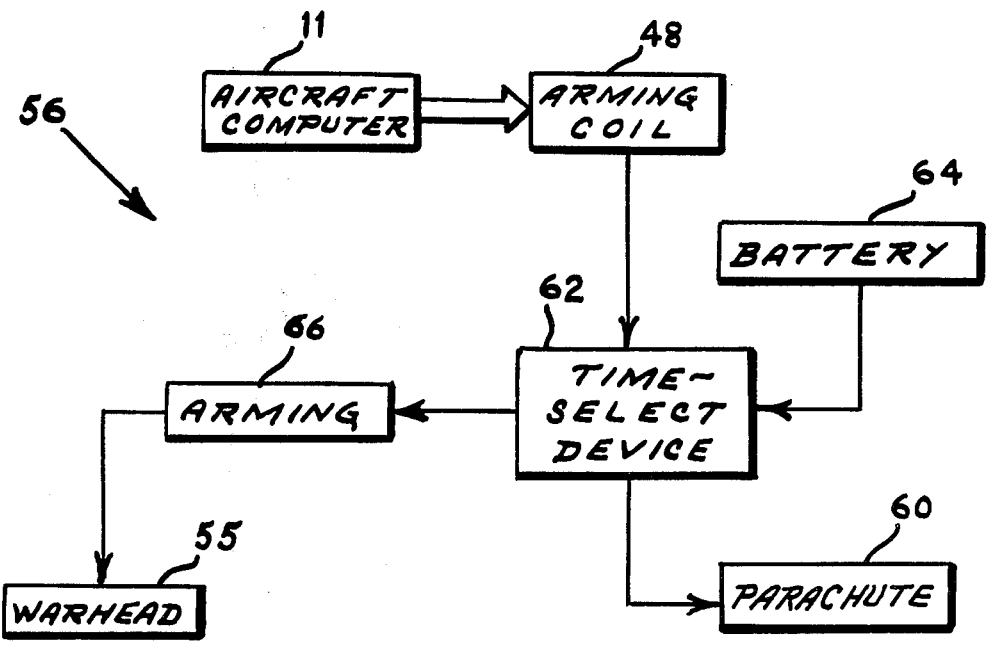
FIG. 12 is a functional block diagram of the bomb dispenser electronics of this invention.

After a given interval from release, time select device 62, FIG. 12, causes the deployment of a lifting-body parachute 54. Explosive ordinance used to deploy parachute 54 is activated by the timing means to open parachute section 60. For example, detonating cord can be installed in the parachute section 60 to open a cover when exploded.

Battery 64 provides power to bomb 52 upon release from dispenser 18. Electrical contacts, such as contact 58, FIG. 7, slidably contact an arming coil 48, FIG. 5, placed at the exit of propulsion chamber 36 so as to cause battery 64 to provide power to timing means 62, arming device 66, and warhead 55, FIG. 12.

Arming device 66 is conventional having at least one input in the preferred embodiment. The detonation time-delay signal is input as electrical contact 58, FIG. 7, passes over arming coil 48. Arming coil 48 is only energized when air bomb system 12 is energized by the pilot with certain exceptions to be noted.

Parachute section 60 contains lifting-body parachute 54, a conventional means of ejecting said parachute such as a detachment spring and a detachable cover plate, all not shown. For example, timing means 62 upon activation and after a fixed period detonates an explosive cord holding the cover plate in place; the detachment spring pushes the parachute 54 out of bomb 52 whereupon it is deployed to lift the bomb 52 toward rearward attacking aircraft 16.

Figure 8:
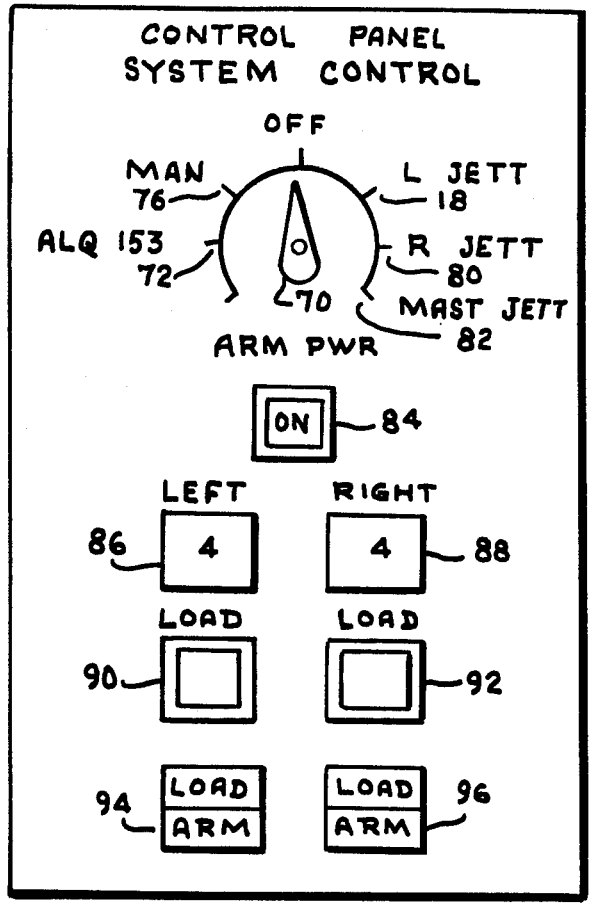
FIG. 8 is a view of a control panel mounted inside a cockpit of an aircraft for controlling the air bomb system of this invention.
Figure 11:
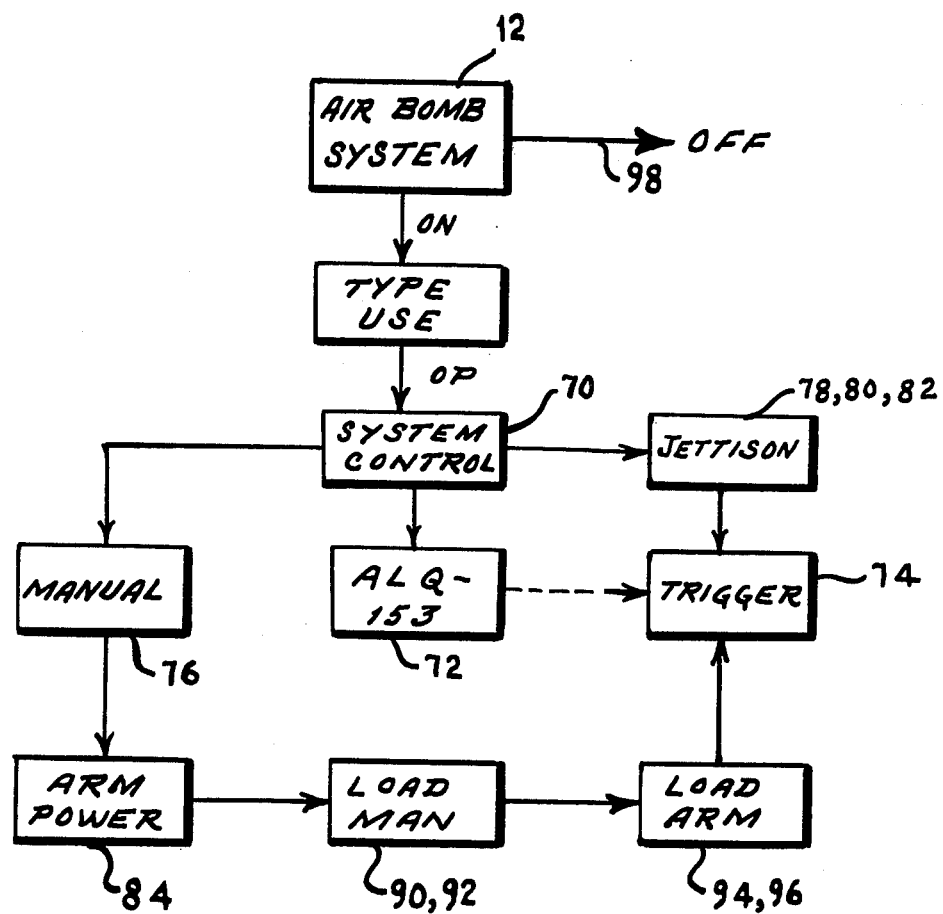
FIG. 11 is a logic flow diagram for operating the air bomb system of this invention.

FIG. 8 is an example of a control panel 68 for air bomb system 12 in the aircraft cockpit. FIG. 11 is a logic flow diagram of the operation of control panel 68. A system control selector 70 provides electrical power and operating mode of dispenser 18. Preceeding clockwise in FIG. 8, ALQ 153 position 72 enables aircraft rearward looking radar system 13 such as a AN/ALQ-153 radar to control automatic dispensing of bombs 52. Rearward looking radar system 13 must be capable of measuring a position of an aircraft well within the state of the art, and be coupled with computer 11 having the flight characteristics of bomb 52 programmed therein so as to be able to calculate a time delay for detonation of bomb 52. The automatic mode is preferred since the aircraft crew is normally involved in other equally demanding tasks. Also, actuating a trigger 74, FIG. 11, can override the automatic system to release one bomb. Trigger 74 can be the conventional gun trigger located on the aircraft control stick (not shown).

In a manual mode position 76 (MAN) each actuation of the gun trigger releases one bomb. The time delay for detonation is the preset time in bomb 52 when it is loaded.

In the left, right, or master jettison mode position 78, 80, and 82 (L. JETT, R. Jett, or MAST JETT), all bombs 52 in either the left, right or both tubes are jettisoned. Arming coil 48 is not activated by MAST JETT for safety reasons. Arming coil 48 is actuated, power applied when an arming power (ARM PWR) button 84 is pushed on. Right and left indicators 86 and 88 display the number of bombs left in the particular tube.

Left and right load buttons 90 and 92 (LOAD) when depressed cause bomb 52 to be loaded into that particular propulsion chamber. Left and right load and armed indicators (LOAD/ARM) 94 and 96 display when that particular tube is ready to be fired by a green light in the LOAD and a red light in the ARM position.

Figure 9:
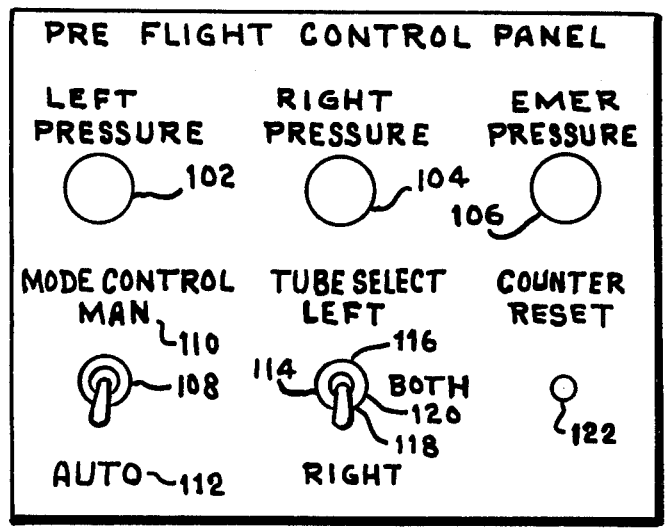
FIG. 9 is a view of a control panel mounted inside the dispenser of FIG. 3.

FIG. 9 is a preflight control panel 100 located in electronic control section 32 of dispenser 18, FIG. 3. Pressure indicators 102, 104, and 106 display the amount of pressure in pressure system 30.

MODE CONTROL SWITCH 108 is a two position toggle switch, labeled (MODE CONTROL) which selects the mode of operation for dispenser 18. In the manual (MAN) position 110 with both tubes 26 and 28 loaded, one tube dispenses all bombs 52 before the other tube will dispense. In the automatic mode (AUTO) 112, each tube dispenses one bomb 52, alternating tubes, until all bombs 52 have been expended. For single tube operation, the system will automatically select the loaded tube. If one tube malfunctions, dispenser 18 will automatically revert to single tube operation using the non-malfunctioning tube. TUBE SELECT SWITCH 114 is a three position toggle switch (TUBE SELECT) that provides manual selection of left, right, or both dispenser tubes for system checkout. In left or right position 116 or 118, only the selected tube will operate. In the BOTH position 120, both dispenser tubes 26 and 28 will operate in accordance with Mode Control switch 108 selection. COUNTER RESET button 122 provides for resetting the counters on control panel 68 in the cockpit to the number of bombs 52 loaded in each tube. Counter reset button 122 is used in conjunction with tube select switch 114 which identifies which counter is being reset. Each depression of reset button 122 advances the counters 86 and 88, in increments of one, to the desired setting.

MODE OF OPERATION

FIG. 11 illustrates the logic flow of the air bomb system 12. The air bomb system 12 is turned on by rotating the system control selector 72 out of OFF position 98, FIG. 8. Pressing of arming power button 84 (ARM PWR), FIG. 8, applies power to arming coil 48, FIG. 5. Arming coil 48 is automatically deenergized when system control selector 70 is placed to MAST JETT position 82.

If bomb 52 is already in propulsion chamber 36, FIG. 5, pushing either load button 90 or 92 (LOAD), FIG. 8, causes bomb 52 to move from a standby position to a ready-to-fire position with a green lighted load button indicating such. If bomb 52 is loaded and armed, the LOAD/ARM button is then green/red. At this point, depressing gun trigger releases one bomb 52. A preset time-delay controls time-to-detonation unless rearward looking radar system 13 provides a different time (ALQ-153 position 72).

Referring to FIG. 5 in particular, after bombs 52 are loaded into dispenser 18, one bomb 52 either in tube 26 or 28 is positioned in propulsion chamber 36 in a standby position wherein retention disk 34 is located approximately one half inch to the left of the position shown in FIG. 5 and firing disk 40 is withdrawn from the tube. Upon pushing of LOAD button 90 or 92, bombs 52 move to the ready-to-fire position shown in FIG. 5. Firing disk 40 is inserted behind bombs 52 and seals propulsion chamber 36. Upon actuating gun trigger, pressure system 30 outputs a high pressure gas stream to the tube 26 or 28 through pressure hose 42. This stream forces bomb 52 past retention disk 34 and by arming coil 48. Bomb 52 is then armed to detonate in a fixed time. The time delay signal can be sent to control section 56 of bomb 52 through electrical contact 58 and arming coil 48. In the automatic mode, no action is required by aircraft crew to release bombs 52.

In the automatic mode, bomb dispensing occurs without crew intervention via a programmed computer carrying out essentially the manual operation noted above. Time-delay detonation signal is sent to bomb 52 according to the closing velocity and distance. Additional bomb dispensing occurs if attacking aircraft 16 remains within radar coverage of beam 15 a fixed period of time after bomb detonation.

Although the invention has been described with reference to a particular embodiment, it will be understood to those skilled in the art that the invention is capable of a variety of alternative embodiments within the spirit and scope of the appended claims.

What is claimed is:

1. An air bomb system for an aircraft for the defense of said aircraft from a rearward attacking aircraft comprising:
   means within said defending aircraft for determining dynamic motion variables of said attacking aircraft;
   means within said defending aircraft for computing a time-delay detonation period and a time for dispensing bombs from said defending aircraft based upon the dynamic motion variables of said dynamic motion variable determining means, and for providing signals in accordance therewith; and
   means located on said defending aircraft for dispensing bombs from said defending aircraft in response to said signals from said computing means whereby dispensed bombs explode in the path of or vicinity of said attacking aircraft.

2. An air bomb system as defined in claim 1 wherein said dynamic motion variable determining means is a rearward looking radar.

3. An air bomb system as defined in claim 1, wherein said computing and providing signals means is a computer programmed to process dynamic motion variables of said attacking aircraft for the purposes of determining timing variables and outputting signals to said dispensing means.

4. An air bomb system as defined in claim 1, wherein said bomb dispensing means comprises:
   aerodynamically shaped means for housing said dispensing means on said defending aircraft;
   a plurality of bomb tubes fixedly mounted in said housing means wherein said bombs are loaded;
   means located in said housing means for providing pressure to said bomb tubes for dispensing said bombs as determined by said computing means; and
   means electrically connected to said computing means for providing control of said dispensing means.

5. An air bomb system as defined in claim 4, wherein each of said bomb tubes comprises:
   a magazine for holding a plurality of said bombs;
   a propulsion chamber for receiving said bombs from said magazine and for expelling said bombs in response to said signal;
   means for transporting said bombs from said magazine to said propulsion chamber; and
   means for arming said bombs in response to said signals of said time computing means whereby said bomb explodes after a given time-delay period.

6. An air bomb system as defined in claim 1 wherein said bombs comprise a warhead section, a control section and a parachute section.

7. An air bomb system as defined in claim 6, wherein said control section comprises timing means for releasing said parachute and exploding said warhead, battery means for providing electrical power to said timing means and to said warhead for detonation, and arming means for receiving said signals and arming said bombs in response thereto.

8. An air bomb system as defined in claim 6, wherein said parachute section comprises a lifting-body parachute fixedly attached to each of said bombs.

* * * * *